US012700304B2

(12) United States Patent
Damani et al.

(10) Patent No.: US 12,700,304 B2
(45) Date of Patent: Aug. 4, 2026

(54) ARTIFICIAL INTELLIGENCE (AI) BASED SMART TRAFFIC MANAGEMENT

(71) Applicants: Manav Damani, Hyderabad (IN); Puneeth Sarma Nimmaraju, Hyderabad (IN); Nityashree Vangala, Hyderabad (IN); Vaishnavi Simran Palreddy, Hyderabad (IN)

(72) Inventors: Manav Damani, Hyderabad (IN); Puneeth Sarma Nimmaraju, Hyderabad (IN); Nityashree Vangala, Hyderabad (IN); Vaishnavi Simran Palreddy, Hyderabad (IN)

( * ) Notice: Subject to any disclaimer, the term of this patent is extended or adjusted under 35 U.S.C. 154(b) by 142 days.

(21) Appl. No.: 18/631,373

(22) Filed: Apr. 10, 2024

(65) Prior Publication Data

US 2025/0014464 A1     Jan. 9, 2025

(51) Int. Cl.
| | |
|---|---|
| *G08G 1/08* | (2006.01) |
| *G06V 10/82* | (2022.01) |
| *G06V 20/54* | (2022.01) |
| *G06V 40/10* | (2022.01) |
| *G08G 1/052* | (2006.01) |
| *G08G 1/082* | (2006.01) |

(52) U.S. Cl.
CPC ............... *G08G 1/08* (2013.01); *G06V 10/82* (2022.01); *G06V 20/54* (2022.01); *G06V 40/10* (2022.01); *G08G 1/052* (2013.01); *G08G 1/082* (2013.01); *G06V 2201/08* (2022.01)

(58) Field of Classification Search
CPC .......... G08G 1/08; G08G 1/052; G08G 1/082; G08G 1/0116; G08G 1/0145; G08G 1/04; G06V 10/82; G06V 20/54; G06V 40/10; G06V 2201/08
See application file for complete search history.

(56) References Cited

U.S. PATENT DOCUMENTS

| | | | |
|---|---|---|---|
| 8,253,592 B1 * | 8/2012 | Chandra | ................ G08G 1/081 |
| | | | 340/913 |
| 8,842,022 B2 * | 9/2014 | Wignot | .................... G08G 1/08 |
| | | | 340/917 |

(Continued)

OTHER PUBLICATIONS

Gandhi et al. (Smart Control of Traffic Light Using Artificial Intelligence, 2020 5th IEEE International Conference on Recent Advances and Innovations in Engineering (ICRAIE) (2020, pp. 1-6)) (Year: 2020).*

(Continued)

*Primary Examiner* — Nay Tun

(57)     ABSTRACT

An Artificial Intelligence (AI) based traffic management system identifies traffic entities including vehicles and people in image data streams obtained from a plurality of cameras installed at traffic signals at an intersection. The traffic management system includes different object detection models for identifying different types of vehicles from the image data streams. The time for crossing of the intersection of different traffic streams is obtained based on corresponding relative densities and the traffic stream with the maximum time for crossing the intersection is first selected to receive a green signal. The remaining traffic signals at the intersection are cyclically selected for receiving the green signal based on the time of crossing of the individual vehicles in a given traffic stream to cross the intersection.

19 Claims, 8 Drawing Sheets

(56) References Cited

U.S. PATENT DOCUMENTS

| | | | | |
|---|---|---|---|---|
| 9,076,332 B2 * | 7/2015 | Myr | | G08G 1/04 |
| 9,159,229 B2 * | 10/2015 | Xie | | G08G 1/0116 |
| 9,349,288 B2 * | 5/2016 | Raamot | | G08G 1/052 |
| 9,412,271 B2 * | 8/2016 | Sharma | | G08G 1/07 |
| 9,805,595 B1 * | 10/2017 | Liebinger Portela | .. | G08G 1/087 |
| 9,965,951 B1 * | 5/2018 | Gallagher | | G08G 1/065 |
| 2018/0096595 A1 * | 4/2018 | Janzen | | G06V 10/94 |
| 2018/0190111 A1 * | 7/2018 | Green | | G08G 1/052 |
| 2020/0334979 A1 * | 10/2020 | Gonçalves | | G08G 1/0129 |
| 2021/0201672 A1 * | 7/2021 | Gao | | G08G 1/0145 |
| 2021/0201673 A1 * | 7/2021 | Nguyen | | G08G 1/087 |
| 2021/0334550 A1 * | 10/2021 | Cho | | G08G 1/08 |
| 2022/0076571 A1 * | 3/2022 | Choi | | G06V 20/54 |
| 2022/0092313 A1 * | 3/2022 | Cheng | | G06N 3/08 |
| 2022/0130242 A1 * | 4/2022 | Li | | G08G 1/087 |
| 2023/0386329 A1 * | 11/2023 | Qian | | H04N 23/10 |

OTHER PUBLICATIONS

Dissannayake et al. ("SmartGo"—Intelligent Traffic Controlling System with Violators Detection, 2022 4th International Conference on Advancements in Computing (ICAC) (2022, pp. 304-309) (Year: 2022).*

* cited by examiner

ARTIFICIAL INTELLIGENCE (AI) BASED SMART TRAFFIC MANAGEMENT

PRIORITY

The present application claims priority under 35 U.S.C. 119(a)-(d) to the Indian Provisional Patent Application No. 202311076295, having a filing date of Apr. 14, 2023, the disclosure of which is hereby incorporated by reference in its entirety.

BACKGROUND

Traffic management involves optimizing the timing and the coordination of traffic signals to improve traffic flow and reduce congestion. Traffic management has become one of the major challenges in urban areas around the world. The increasing number of vehicles on roads has not only led to traffic congestion but also resulted in the wastage of fuel and energy. Efficient traffic light management can enhance safety, reduce travel time and minimize environmental impact. Many technologies have been used for improving management of traffic around the world.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1A:
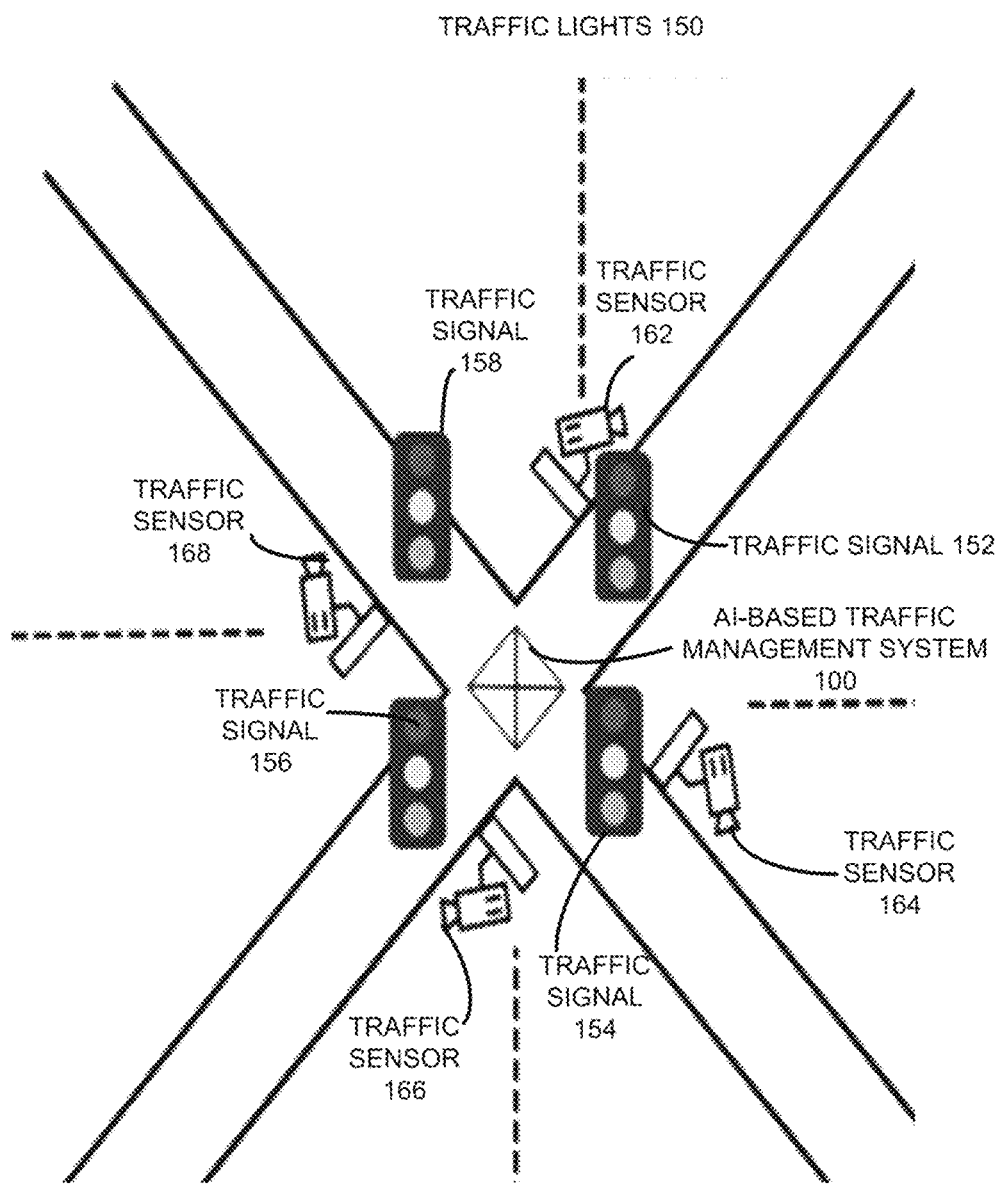
FIG. 1A illustrates a block diagram of an AI-based traffic management apparatus in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

A system of one or more computing devices can be configured to perform particular operations or actions by virtue of having software, firmware, hardware, or a combination of them installed on the system that in operation causes or cause the system to perform smart traffic signal management using Artificial Intelligence (AI) based techniques for optimizing waiting time at traffic intersections while maintaining privacy. One general aspect includes an AI-based traffic control system which includes at least one processor and a memory on which is stored machine-readable instructions that when executed by the processor, cause the processor to: identify traffic entity streams including vehicles and pedestrians such as living beings and moveable objects in image data streams obtained from a plurality of cameras, where the plurality of cameras are installed on the traffic signals and/or pedestrian crossing signals pointed in different directions at an intersection. The vehicles include different types of vehicles classified based on the number of wheels, e.g., two wheelers, four wheelers, eighteen wheelers, etc. The AI-based traffic management system further implements a relative density calculation wherein the different types of vehicles which are identified are converted into multiples of a single entity The time for crossing of the intersection of a subset of the traffic entities e.g., vehicles/pedestrians in the traffic or pedestrian streams from the plurality of cameras is calculated. The traffic signal or pedestrian crossing signals at the intersection are manipulated cyclically, where in a given cycle each traffic signal or pedestrian crossing signal receives a green signal. An order of the traffic signals or pedestrian crossing signals to receive the green signal in the given cycle is determined based on the time required for crossing the intersection of the subsets of the individual vehicles/pedestrians.

Implementations may include one or more of the following features. The AI-based traffic control apparatus with the at least one processor and the memory can be installed on a fixture including one or more of the plurality of cameras. The machine-readable instructions further cause the at least one processor to: flush a subset of the image data streams corresponding to the given cycle from the memory at an end of the given cycle. The machine-readable instructions to identify the individual vehicles cause the at least one processor to append the image data streams received from multiple cameras pointing in a same direction. The machine-readable instructions to identify the individual vehicles cause the at least one processor to provide the image data streams to a plurality of object detection models; and identify, by the plurality of object detection models a type of the individual vehicles from the image data streams. The plurality of object detection models are trained in identifying a corresponding type of vehicle or pedestrians of different types. The plurality of object detection models include You Only Look Once (YOLO) models. Such models include Yolo 5 and Yolo 8. The machine-readable instructions to estimate the time for crossing of the intersection further cause the at least one processor to count the individual vehicles in the at least two subsets and estimate the time for crossing based on average acceleration of each of the different types of vehicles identified from the image data streams. The machine-readable instructions to manipulate the traffic signals at the intersection cyclically further cause the at least one processor to transmit a signal to the traffic signal pointed in the direction having a maximum value for the estimated time for vehicles to cross the intersection to turn green. The machine-readable instructions further cause the at least one processor to transmit a signal to change the traffic signal from green after a predetermined time period, where the predetermined time period is based on an average speed of the vehicles of different types identified from the corresponding image data stream of the plurality of cameras associated with the traffic signal. Implementations of the described techniques may include hardware, a method or process, or computer software on a computer-accessible medium.

One general aspect includes a processor-executable method of optimizing traffic signals. The processor-executable method of optimizing traffic signals also includes receiving, by at least one processor, image data streams including images of traffic streams captured by a plurality of image sensors installed in different directions at a traffic signal in an intersection. In an example, a traffic stream can include one or more vehicles lined up in a particular direction at a traffic signal to cross the intersection. The traffic signal has a plurality of sets of traffic lights facing the different directions. The image data streams are analyzed via a plurality of machine learning (ML) models are for identifying vehicles of different types from the image data streams. The different types of vehicles are identified by a corresponding ML model of the plurality of ML models. The different types of vehicles include vehicles differentiated based on a number of wheels on a particular vehicle type. The output of the plurality of ML models is converted into single value data (SVD) wherein the different traffic entities e.g., vehicles are converted into multiples of a particular common entity and a relative density of the traffic stream is obtained where the different types of vehicles in a given traffic stream are all identified as multiples of the common entity.

A time for crossing the intersection by the traffic streams in the different directions is calculated by the at least one processor and one of the traffic streams having a maximum value for the time for crossing the intersection is identified. The processor transmits a first signal to turn green, to a set of traffic lights facing one of the traffic streams with the maximum value for the time for crossing the intersection. At end of a period for crossing the intersection; a second signal to change color is transmitted by the processor to the set of traffic lights. The steps of analyzing, identifying, calculating, determining, transmitting a signal to turn green, sensing, and transmitting a second signal to change color, until each set of traffic lights in the plurality of traffic lights facing the different directions receive the first signal at least once are cyclically repeated by the processor. At the end of each cycle, the processor flushes the image data streams accumulated during a cycle of traffic signal changes.

One general aspect includes a non-transitory storage medium may include machine-readable instructions that cause at least one processor to execute tasks or processes to manipulate the traffic signals for time optimization. The machine-readable instructions cause the processor to receive image data streams including images of traffic streams captured by a plurality of image sensors installed in different directions at a traffic signal in an intersection where the traffic signal has a plurality of sets of traffic lights facing the different directions. The machine-readable instructions further cause the processor to analyze by a plurality of machine learning (ML) models, the image data streams for identifying vehicles of different types in the traffic stream. The machine-readable instructions further cause the processor to calculate, a time for crossing the intersection by the traffic streams in the different directions and determine one of the traffic streams having a maximum value for the time for crossing. The machine-readable instructions further cause the processor to transmit a first signal to turn green to the set of traffic lights facing the traffic stream with the maximum value for the time for crossing the intersection; The processor, by executing the machine-readable instructions senses an end of a period for the time for crossing the intersection and transmits a second signal to the set of traffic lights to change color.

Implementations may include one or more of the following features. The non-transitory storage medium may include further instructions that cause at least one processor to repeat cyclically, the steps of analyzing, identifying, calculating, determining, transmitting a signal to turn green, sensing, and transmitting a second signal to change color, until each set of traffic lights in the plurality of traffic lights facing the different directions receives the first signal at least once. When each of the plurality of sets of traffic lights has received a green signal, the image data streams accumulated during the cycle are flushed.

The use of AI in traffic management generally requires expensive hardware as the object recognition, the consequent calculations and the traffic signal management have to happen in real-time. The AI-based traffic management systems and methods disclosed herein provide for a simplified system and method wherein inexpensive hardware installed at traffic signals can be used for manipulating the traffic lights. Leveraging object detection technologies with the conversion of the ML output data into SVD allows for the use of inexpensive hardware while speeding up the data processing. Furthermore, the use of relative density further enhances the efficiency of the traffic management system by simplifying the data processing and hence speeding up calculations such as the intersection crossing times for traffic streams. Such speedy calculations enable the vehicle detection to happen in parallel while the signals are allotted dynamically. In fact, certain embodiments of the traffic management system use no database in the entire process. Therefore, the AI-based traffic management system provides a technical solution of simplifying data format to the technical problem of speeding up the object detection data processing without the need for expensive hardware.

2. System Architecture

FIG. 1A illustrates a block diagram of a set of traffic signals or traffic lights 150 including—an AI-based traffic management system 100 (hereinafter referred to as 'the system 100') in accordance with the examples disclosed herein. At least some components of the system 100 are installed at the traffic lights 150 with four traffic signals 152, 154, 156, 158 with corresponding traffic sensors/cameras 162, 164, 166, and 168 in accordance with one example. In an example, the system 100 can be entirely installed at the traffic signal 150. However, the system 100 can be installed at a traffic signal with more than one traffic light and corresponding camera device. In an example, the camera devices can include Closed Circuit Television (CCTW) cameras. The traffic lights can be changed from red to green and green to orange and red. It can be appreciated that the system 100 is shown at the center of the traffic lights 150 for illustration purposes only and that the system 100 can be installed on any of the four traffic signals 152, 154, 156, 158 or even a remote location.

The system 100 manipulates the traffic signals to optimize the time period of the green signal so that enough time is provided to clear the traffic facing the traffic signal while changing the traffic signal from the green signal to a red signal once the traffic has cleared the intersection. The traffic can include different types of vehicles such as vehicles with two wheels ('two wheelers'), vehicles with three wheels ('three wheelers'), vehicles with four wheels ('four wheelers'), etc. The time period of the green signal is calculated based on the number and types of vehicles and aggregating the time taken by the individual vehicles in the traffic stream to cross the intersection. In an example, the system 100 can operate as a complete unit for routine functions so that the traffic data collection, analysis and operation of the traffic signals are executed without the necessity for network connectivity. Of course, the system 100 may be capable of being connected to a network for maintenance activities or for data collection to train AI models, etc. as needed. In another embodiment includes giving priority to special vehicles such as ambulances and police cars, providing priority to emergency vehicles. The model also identifies if ambulances or police cars have their emergency lights on so that they provided priority.

Figure 1B:
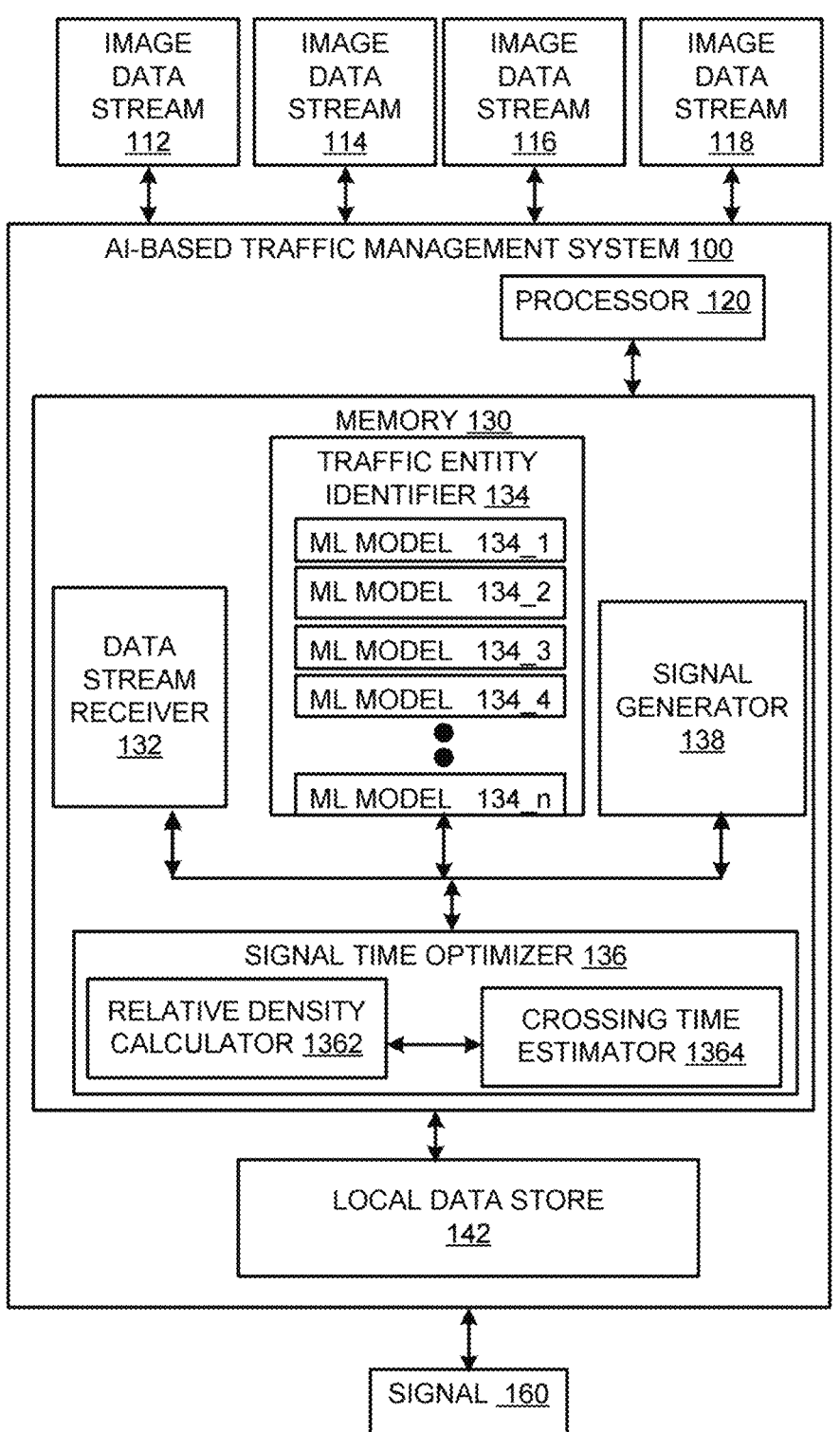
FIG. 1B shows another block diagram of the AI-based traffic management apparatus in accordance with the examples disclosed herein.

The operations of the traffic signal 150 will be described with reference to FIG. 1B which shows another block diagram of the system 100 in accordance with an example. The system 100 can include a processor 120 and a memory 130 connected to the processor (not shown) that stores processor-executable instructions that enable the system 100 to optimize the changes of the traffic signal 150 as detailed herein. The processor 120 is a semiconductor-based microprocessor, a central processing unit (CPU), an application-specific integrated circuit (ASIC), a field-programmable gate array (FPGA), and/or other hardware device. The memory 130, may also be termed a computer-readable medium and is, for example, a Random Access memory (RAM), an Electrically Erasable Programmable Read-Only Memory (EEPROM), a storage device, or the like. In some examples, the memory 130 is a non-transitory computer-readable storage medium, where the term "non-transitory" does not encompass transitory propagating signals. In any regard, the memory 130 has stored thereon machine-readable instructions executable respectively by processor 120. Similarly, the local data store 142 although shown as being outside the memory 130 may also be a part of the memory 130 in some examples. The memory and the local data store 142, may also be a Random Access memory (RAM), an Electrically Erasable Programmable Read-Only Memory (EEPROM), a storage device, or the like. In an example, the system 100 can include single-board computers (SBCs) such as Raspberry Pi®.

The memory 130 can include a data stream receiver 132, a traffic entity identifier 134, a signal time optimizer 136 and a signal generator 138. The data stream receiver 132 receives image data streams from cameras installed at the traffic signal 150. Accordingly, four image data streams 112, 114, 116 and 118 corresponding to each of the traffic signals in the four directions are received by the system 100. Although only one camera is shown as being installed for each of the traffic signals 152, 154, 156 and 158, and correspondingly one streams is shown as being received, it can be appreciated that more than one camera can be installed for a given traffic signal. Furthermore, the cameras can be placed on the traffic signals at the intersection or different cameras can be placed at different positions along the street at a distance from the traffic signal but communicatively coupled to the system 100 in order to accurately capture the traffic images. In case more than one camera is installed for one traffic light, the image data streams from different cameras in one direction can be received and appended by the data stream receiver 132 for analysis and estimation of the time of crossing for a traffic stream.

The image data streams 112, 114, 116 and 118 are analyzed by the traffic entity identifier 134 to identify individual traffic entities including vehicles, living beings e.g., persons, animals, and inanimate moveable objects, e.g., strollers, push carts, etc., in an image data stream. The traffic entity identifier 134 includes a plurality of machine learning (ML) models 134_1, 134_2, . . . , 134_n. Each of the ML models 134_1, 134_2, . . . 134_n can be trained on images of a particular type of traffic entity to identify the traffic entity of a given type. For example, model 134_2 may identify a two-wheeler, model 134_3 may identify a three-wheeler, model 134_4 may identify a four-wheeler, etc. Similarly, other ML models can be trained to identify living beings, or other inanimate moveable objects. The ML models 134_1, 134_2, . . . , 134_n can be based on different object detection algorithms such as but not limited to, Region-Based Convolution Neural Network (R-CNN), Fast R-CNN, Faster R-CNN, SSD (Single Shot Detector), and YOLO (You Only Look Once). R-CNN algorithms use a region proposal network (RPN) to detect objects in images. SSD is a one-stage detector that uses a single convolutional neural network (CNN) to detect objects. YOLO is another one-stage detector that uses a single CNN to detect objects in images and videos. In an example, one or more of the ML models 134_1, 134_2, . . . , 134_n can be based on YOLO which provides for real-time object detection and can process hundreds of images per second depending on the hardware used for processing.

In an example, the output of the traffic entity identifier 134 may be converted by the relative density calculator 1362 into single value data (SVD) for relative density calculation. To obtain SVD from the output of the traffic entity identifier 134, the different types of traffic entities including vehicles and pedestrians can be converted into multiples of a single common entity. For example, if the common entity is a car, then the value of a car is identified as '1', therefore a two-wheeler can be identified as '0.5', a three-wheeler as '0.75' while an eight wheel truck is identified as '2'. The relative density calculator 1362 characterizes the traffic in an image data stream in terms of a simple number representative of the number and the different types of vehicles. Therefore, a traffic stream with three cars, two bicycles and one eight wheel truck would have relative density equal to 3+1+2-6. Thus, instead of having to process data of different classifications/categories, the output of the traffic entity identifier 134 is flattened into a simpler format. Such data simplification lends itself to being processed by smaller, inexpensive hardware which can be easily installed at every traffic signal. The relative density is provided to the crossing time estimator 1364 which may apply the average time taken by a car for crossing the intersection and the number of traffic lanes to determine the time for crossing the intersection of the traffic streams in all the directions. The crossing times are compared and the traffic signal with the maximum value for the time for crossing the intersection e.g., traffic signal 152 is selected for activation. In an example, the relative density data may be temporarily stored in the local data store 142 but may be flushed out at the end of the cycle. In certain examples, however, the output of the traffic entity identifier 134 may also be stored in a local or remote relational database in accordance with other examples.

The signal generator 138 is enabled by the signal time optimizer 136 to transmit a signal 160 to the traffic light 152 controlling the traffic stream with the maximum time for crossing the intersection. While the green signal is active for the traffic signal 152, the system 100 continues to collect data for the remaining three sides i.e., traffic signals 154, 156 and 158, taking into account the dynamic nature of traffic. The time period for the green signal is calculated and at the end of the time period, another signal may be transmitted by the signal generator 138 to change the green light to another colour. When the green signal time for the traffic light 152 is complete, the system 100 determines and activates the next side to receive the green signal based on the data collected during the green signal time of the traffic light 152. The signal time optimizer 136 determines the side with the maximum value for the time for crossing and allocates the green signal to that side, allowing vehicles to pass through. This process is continued cyclically as described herein. The system 100 therefore minimizes the waiting time for vehicles and reduce traffic congestion at the crossing. The accuracy and the effectiveness of the system 100 is improved by using real-time data from sensors and/or cameras that provide real-time data about the traffic flow at the crossing.

As the image data streams include traffic entity streams of vehicles, living beings and moveable objects, the traffic management system 100 can also be configured to manage passage of people and moveable objects across pedestrian crossings. In this embodiment, the pedestrian crossing signal with the maximum number of people and moveable objects to cross or the maximum time to cross the pedestrian crossing is selected first in the cycle. Other pedestrian crossing signals are cyclically selected as detailed further herein based on their respective time of crossing. Furthermore, the AI-based traffic management system 100 can be implemented to simultaneously operate the traffic signals and the pedestrian crossing signals in parallel.

Figure 2A:
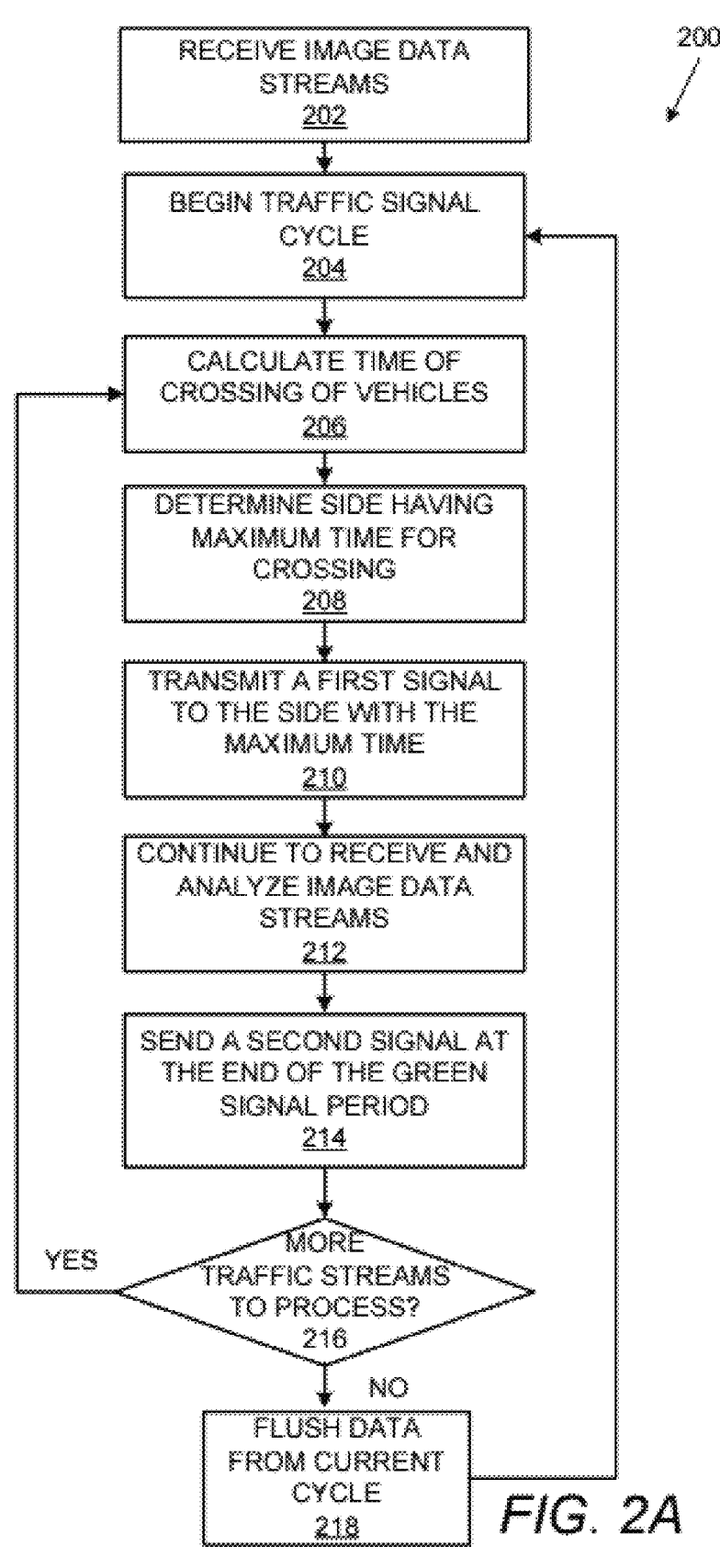
FIG. 2A depicts a flow diagram of a method of managing traffic while optimizing for wait time in accordance with embodiments of the present disclosure.

Various manners in which the processor 120 of the system 100 operates are discussed in greater detail with respect to the method 200 depicted in FIG. 2A. Particularly, FIG. 2A depicts a flow diagram of a method 200 of managing traffic while optimizing for wait time in accordance with embodiments of the present disclosure. It should be understood that the method 200 may include additional operations and that some of the operations described therein may be removed and/or modified without departing from the scope of the method 200. The description of the method 400 is made with reference to the features depicted in FIGS. 1A and 1B for purposes of illustration.

The method begins at 202 wherein images of traffic data at a crossing is received in the form of data stream from the plurality of cameras 162, 164, 166, and 168. In an example, each of the plurality of cameras 162, 164, 166, and 168 can be assigned a unique Internet Protocol (IP) address and the network settings (e.g., Dynamic Host Configuration Protocol (DHCP) or static IP) can be configured so that the cameras are connected to the network and communicate with the system 100. In an example, the data from the cameras 162, 164, 166, and 168 is written to a simple file instead of a server or a database so that storage and retrieval of data is simpler and quicker while reducing complexity and cost. Depending on the use cases a static or dynamic file system 100 can be used. In an example, intermediate data is often stored in CSV format and converted into desired formats (e.g. JSON, XML) to make it easier for further processing. This can improve the efficiency of the system by reducing the amount of data that needs to be parsed and processed.

At 204, a cycle of traffic signal changes is begun and the image data streams 112, 114, 116 and 118 are processed for vehicle identification. Different types of vehicles can be identified using the plurality of ML models 134_1, 134_2, 134_n. At 206, one or more of the number of vehicles and the time for crossing of the intersection for each traffic stream are calculated. In an example, the number of vehicles can be obtained and the type of individual vehicles can be obtained from the image data streams 112, 114, 116 and 118. The time for crossing the intersection can also be obtained using the length of the intersection, average acceleration or speed of each type of vehicle, the total number of vehicles identified from the different image data streams and optionally the speed limit at the crossing.

At 208, the side which has the maximum time for crossing the intersection is determined by comparing the time for crossing of the traffic stream for each of the four traffic signals 152, 154, 156 and 158. At 210, a first signal is transmitted by the signal generator 138 to one of the four traffic signals 152, 154, 156 and 158 with the maximum time for crossing is activated to receive green light. The time period of the green light can also be determined and set based on the time of crossing of the traffic stream. During the time period that the green light is on, the system 100 continues to receive and analyse the image data streams from the remaining three cameras of the plurality of cameras 164, 166, and 168 as show at 212. At the end of the time period, a second signal can be transmitted to change the colour of the green light 214.

At 216, it is determined if further traffic streams in other directions remain to be processed in the current cycle. If yes, the method returns to 206 to determine the time of crossing of the traffic stream from the remaining cameras. The remaining traffic signals are each processed by cycling through the blocks 206 to 216. If it is determined at 216 that no further traffic streams remain for processing in the current cycle, the traffic data stream collected in the current cycle is flushed from the memory at 218 and the method returns to 202 to start a fresh cycle. Large dynamic files can consume a lot of memory and slow down the system 100. Flushing the buffer on a timely basis can help prevent memory overload and improve performance. The data flush allows the system 100 to continue processing data while also freeing up memory. Generally, in a traffic signal with different directions, the system 100 cycles through the each of the different directions leaving out the directions whose data stream is already processed and traffic signal has received a green light in the current cycle and the method returns to block 204 to begin a new traffic signal cycle.

Figure 2B:
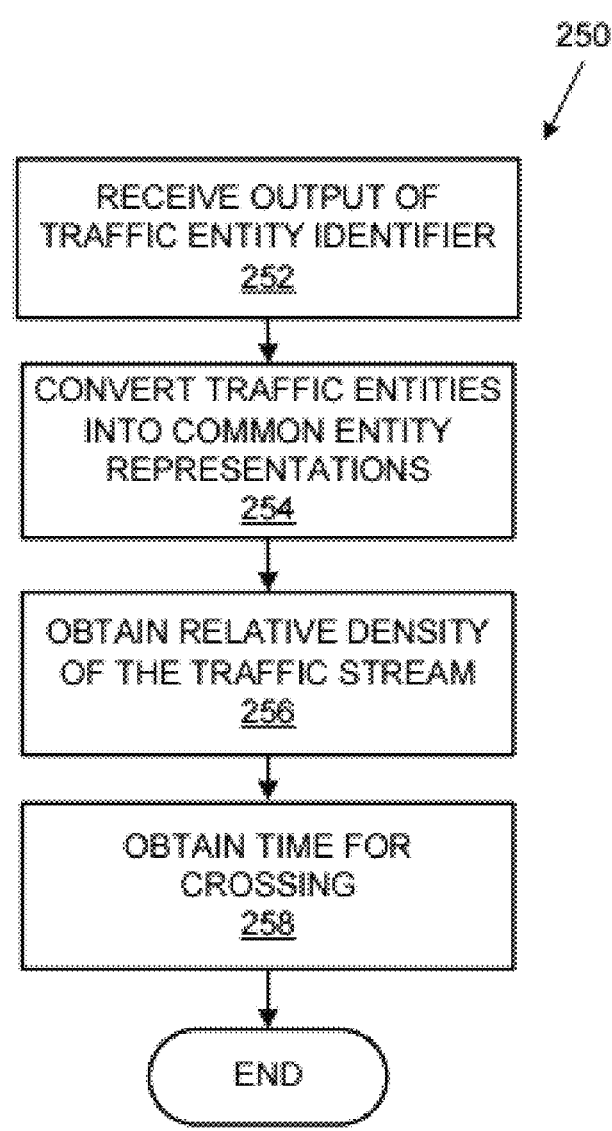
FIG. 2B shows a flowchart to obtain the time for crossing the intersection for a given traffic stream in accordance with some examples disclosed herein.

FIG. 2B shows a flowchart 250 to obtain the time for crossing the intersection for a given traffic stream in accordance with some examples. The method begins at 252 to receive output of the traffic entity identifier 134 which includes the entities identified in an image data stream corresponding to a traffic stream as captured by one of the plurality of traffic sensors/cameras 162, 164, 166 and 168. At 254, each traffic entity in the output of the traffic entity identifier 134 is converted into a representation of a common entity, e.g., a multiple of the common entity. At 256, the relative density of the traffic stream is calculated. In an example, the relative density of the traffic stream can be obtained as sum of all the representations obtained at block 254. At 258, the time for crossing the intersection can be obtained via simple mathematical calculation using the relative density, average acceleration of the common entity and the length of the intersection.

Figure 3A:
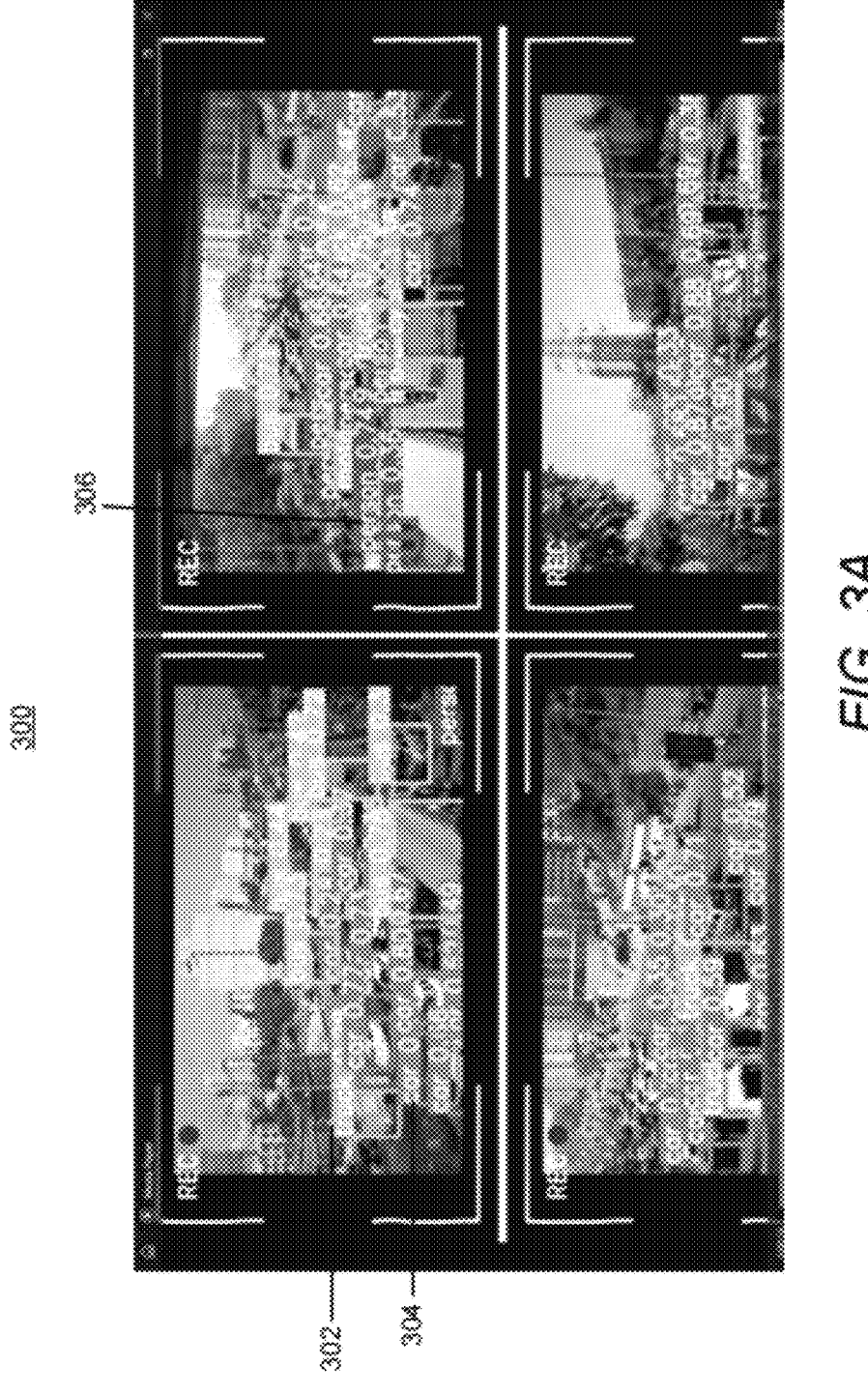
FIG. 3A illustrates an output of the traffic entity identifier by the AI-based traffic management system in accordance with the examples disclosed herein.

FIG. 3A illustrates an output 300 of the traffic entity identifier 134 in accordance with some examples. The vehicles 302, 304, etc. and living beings e.g., person 306 in a traffic stream are individually identified along with the confidence values. Various types of traffic entities are identified by ML models 134_1, 134_2 . . . , 134_n, with each of trained to identify a particular traffic entity. In an example, the ML models 134_1, 134_2, . . . , 134_n can each be trained via supervised training on labeled training data or via unsupervised training. The traffic entity detection happens in parallel to the dynamic changes of the traffic signals. The usage of a simple file system enables fast processing of the traffic stream data in real-time and thereby dynamically changing the traffic signals. Furthermore, the storage and flushing of data at the end of each cycle keeps the system 100 simple allowing usage of cost-efficient hardware while addressing privacy concerns. In an example, anonymized data can be stored along with accuracies for further training/ refining of the ML models 134_1, 134_2 . . . 134_n.

Figure 3B:
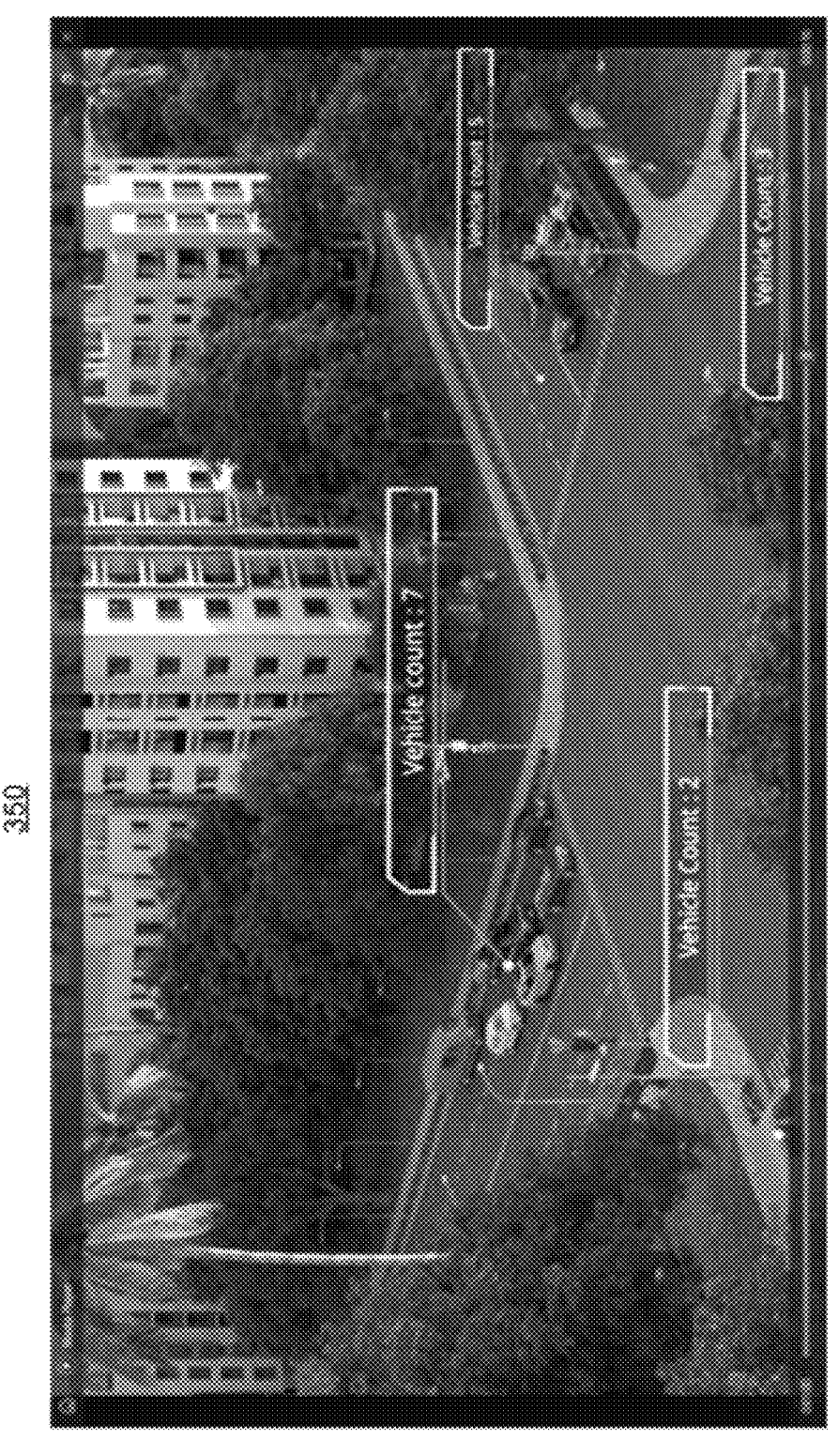
FIG. 3B shows yet another output of the traffic entity identifier in accordance with the examples disclosed herein.

FIG. 3B shows an image 350 yet another output of the traffic entity identifier 134 which can include a count of the vehicles in a given traffic stream. Four traffic streams at an intersection are shown in image 350. In an example, the count can be obtained programmatically by counting the number of entities output by the plurality of ML models 134_1, 134_2, . . . , 134_n. The vehicle counts are converted into relative density via reducing the vehicles to common entity representations for quicker calculations which can optimize signal timings in real-world scenarios.

Figure 4:
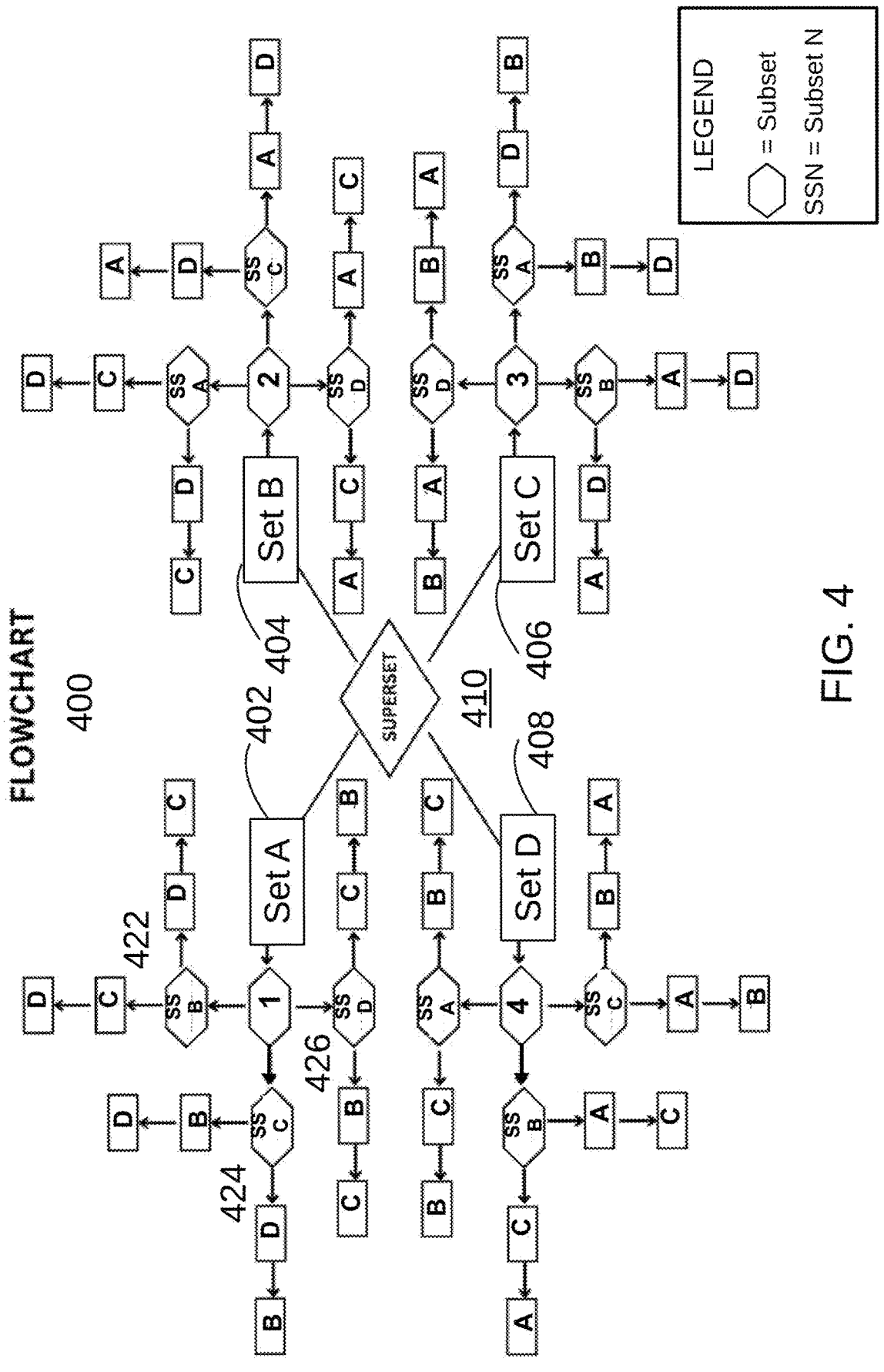
FIG. 4 shows a flowchart representing the various data sets generated by the traffic signals according to the examples disclosed herein.

FIG. 4 shows a flowchart 400 representing the various data sets generated by the traffic signals 152, 154, 156, and 158 according to an example. The superset 410 represents the various possible permutations of the four traffic lights. Hence, the superset 410 includes four sets of traffic streams labeled in the flowchart as A, B, C. D wherein each alphabet represents traffic stream associated with one of the four traffic signals 152, 154, 156 and 158. A traffic stream that is initially selected is designation as a set while the remaining traffic streams are designated as subsets. Therefore, at 402 for set A there are three subsets e.g., subset B as shown at 422, subset C as shown at 424 and subset D as shown at 426. When the traffic signal associated with the set A is initially selected based for example, on the time of crossing of the traffic stream, the remaining subsets B, C and D are processed during the time period when the traffic signal for set A has turned green. Therefore, the system 100 processes the steps 202 to 216 as shown in FIG. 2. On the conclusion of the cycle at block 216, the system 100 may choose the next set from sets B 404, set C 406, and set D 408 depending on factors detailed herein. For example, if set D is chosen, then each of the subsets A, B and C are cycled through as detailed in FIG. 2 above and the traffic stream data may be flushed at the end of each cycle.

Figure 5:
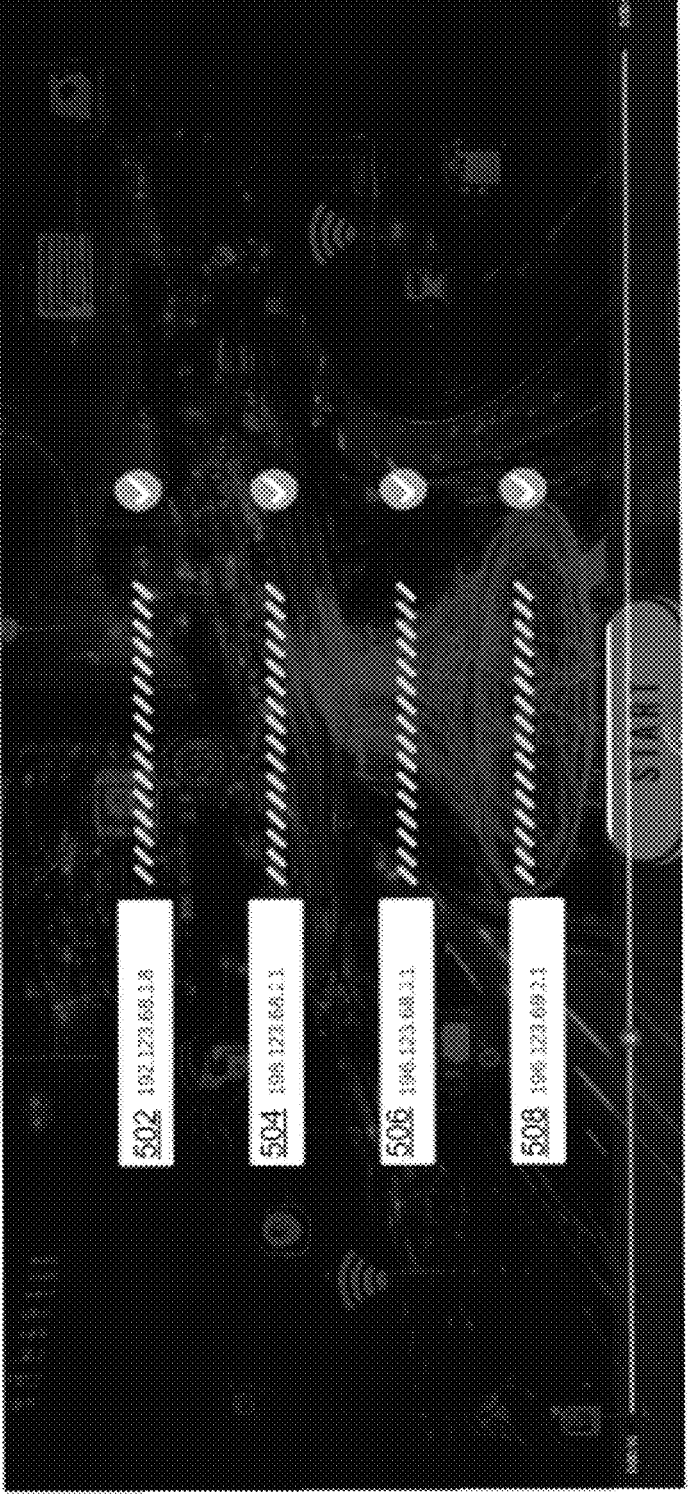
FIG. 5 shows a front end of the AI-based traffic management system in accordance with the examples disclosed herein.

FIG. 5 shows a front end 500 of the system 100 in accordance with an example. The front end 500 shows processing of the four data streams 112, 114, 116, and 118 from each of the four traffic sensors/cameras 162, 164, 166, and 168 which communicate with the system 100 via their respective IP addresses 502, 504, 506 and 508. If a greater number of traffic sensors or cameras are used, then there would be a correspondingly higher number of traffic streams from the corresponding IP addresses and the image data streams from the cameras capturing the same traffic stream would be appended for further processing. The image data is validated and stored, for example, in CSV files and converted into a desired format for further processing.

What has been described and illustrated herein is an example along with some of its variations. The terms, descriptions, and figures used herein are set forth by way of illustration only and are not meant as limitations. Many variations possible within the spirit and scope of the subject matter, which is Intended to be defined by the following claims and that equivalents.

What is claimed is:

1. An Artificial Intelligence (AI) based traffic control apparatus comprising:
   at least one processor,
   a memory,
   wherein the at least one processor and memory are installed on at a traffic signal bearing multiple traffic lights, and
   the memory stores machine-readable instructions that when executed by the processor, cause the processor to:
   identify traffic entities comprising vehicles, inanimate moveable objects and living beings in image data streams obtained from a plurality of cameras,
   wherein at least two of the plurality of cameras are installed on at least two traffic lights pointed in at least two different directions at an intersection to image at least two traffic streams in the at least two different directions,
   wherein the vehicles include different types of vehicles;
   generate representations of different types of vehicles in the at least two traffic streams as multiples of the single entity based on a number of wheels on each of the different types of vehicles;
   obtain two aggregates of the representations corresponding to the at least two traffic streams as the corresponding relative densities;
   obtain corresponding relative densities of the at least two traffic streams from the two aggregates;
   determine, based at least on the relative densities of the at least two traffic streams, times for crossing the intersection of the at least two traffic streams; and
   manipulate the traffic lights at the intersection cyclically, wherein in a given cycle each traffic light of the at least two traffic signals receives a green signal and an order of the traffic lights to receive the green signal in the given cycle is determined based on the times of the at least two traffic streams to cross the intersection.

2. The AI-based traffic control apparatus of claim 1, wherein the at least one processor and the memory are installed on a fixture including one or more of the plurality of cameras.

3. The AI-based traffic control apparatus of claim 2, wherein the machine-readable instructions further cause the at least one processor to:
   flush a subset of the image data streams corresponding to the given cycle from the memory at an end of the given cycle.

4. The AI-based traffic control apparatus of claim 1, wherein the machine-readable instructions to identify the individual vehicles cause the at least one processor to:
   append at least two of the image data streams received from at least two of the plurality of cameras pointing in a same direction of the at least two different directions.

5. The AI-based traffic control apparatus of claim 1, wherein the machine-readable instructions to identify the individual vehicles cause the at least one processor to:
   provide the image data streams to a plurality of object detection models; and
   identify, by the plurality of object detection models a type of the individual vehicles from the image data streams.

6. The AI-based traffic control apparatus of claim 5, wherein the machine-readable instructions further cause the at least one processor to:

train the plurality of object detection models in identifying a corresponding type of vehicle.

7. The AI-based traffic control apparatus of claim 5, wherein the plurality of object detection models include You Only Look Once (YOLO) models.

8. The AI-based traffic control apparatus of claim 1, wherein the machine-readable instructions to manipulate the traffic signals at the intersection cyclically further cause the at least one processor to:

transmit a signal to turn green to the traffic light pointed in one of the at least two directions having a maximum value for the time to cross the intersection for a corresponding subset of the individual vehicles.

9. The AI-based traffic control apparatus of claim 8, wherein the machine-readable instructions further cause the at least one processor to:

transmit a signal to change the traffic light when the time elapses.

10. The AI-based traffic control apparatus of claim 1, wherein the machine-readable instructions further cause the at least one processor to:

identify the vehicles of the different types from the image data streams in parallel with the manipulation of the traffic lights.

11. A processor-executable method of optimizing traffic signals comprising:

receiving, by at least one processor installed at a traffic signal and executing instructions stored in a memory installed at the traffic signal, image data streams including images of traffic entity streams captured by a plurality of image sensors installed in different directions at the traffic signal in an intersection wherein the traffic signal has a plurality of sets of traffic lights facing the different directions;

analyzing, by the at least one processor using a plurality of machine learning (ML) models stored in the memory, the image data streams for vehicular identification;

identifying based on the analysis, by the at least one processor, traffic entities representing vehicles of different types from the image data streams;

generating, by the at least one processor, representations of different types of vehicles in the at least two traffic streams as multiples of the single entity based on a number of wheels on each of the different types of vehicles;

obtaining, by the at least one processor, two aggregates of the representations corresponding to the at least two traffic streams;

obtaining, by the at least one processor, corresponding relative densities of the at least two traffic streams from the two aggregates;

calculating, by the at least one processor, a time for crossing the intersection by the traffic entity streams in the different directions based at least on the corresponding relative densities of the traffic entity streams;

determining, by the at least one processor, one of the traffic entity streams having a maximum value for the time for crossing the intersection;

transmitting, by the at least one processor, a first signal to turn green, to a set of traffic lights of the plurality of sets of traffic lights facing one of the traffic streams with the maximum value for the time for crossing the intersection;

sensing, by the at least one processor, an end of a period of the maximum value of the time for crossing the intersection; and transmitting by the at least one processor, a second signal to change color to the set of traffic lights at the end of the period.

12. The method of claim 11, further comprising:

repeating cyclically, by the at least one processor, the steps of analyzing, identifying, calculating, determining, transmitting a signal to turn green, sensing, and transmitting a second signal to change color, until each set of traffic lights in the plurality of traffic lights facing the different directions receive the first signal at least once.

13. The method of claim 12, further comprising:

flushing, by the at least one processor, the image data streams accumulated during a cycle of traffic signal changes.

14. The method of claim 11, wherein the traffic entity streams includes living beings and moveable objects and the traffic signal is a pedestrian crossing signal.

15. The method of claim 11, wherein the traffic entity streams includes vehicles differentiated based on a number of wheels on a particular vehicle type and the traffic signal is a signal that allows passage of the vehicles.

16. A non-transitory storage medium comprising machine-readable instructions that cause at least one processor to:

receive image data streams including images of traffic streams captured by a plurality of image sensors installed in different directions at a traffic signal in an intersection wherein the traffic signal has a plurality of sets of traffic lights facing the different directions;

analyze by a plurality of machine learning (ML) models, the image data streams for vehicular identification;

identify, by the at least one processor, vehicles of different types from the image data streams;

generate representations of different types of vehicles in the at least two traffic streams as multiples of the single entity based on a number of wheels on each of the different types of vehicles;

obtain corresponding aggregates of the representations for each of the traffic streams;

obtain respective relative densities of the traffic streams from the corresponding aggregates;

calculate, a time for crossing the intersection by the traffic streams in the different directions from the respective relative densities;

determine one of the traffic streams having a maximum value for the time for crossing the intersection;

transmit, a first signal to turn green, to a set of traffic lights of the plurality of sets of traffic lights facing one of the traffic streams with the maximum value for the time for crossing the intersection;

sense an end of a period of the maximum value for the time for crossing the intersection; and transmit a second signal to change color to the set of traffic lights at the end of the period.

17. The non-transitory storage medium of claim 16, comprising further instructions that cause at least one processor to:

repeat cyclically, by the at least one processor, the steps of analyzing, identifying, calculating, determining, transmitting a signal to turn green, sensing, and transmitting a second signal to change color, until each set of traffic lights in the plurality of traffic lights facing the different directions receive the first signal at least once.

18. The non-transitory storage medium of claim 16, comprising further instructions that cause at least one processor to:

flush at an end of a cycle of traffic signal changes wherein each of the plurality of sets of traffic lights has received a green signal, the image data streams accumulated during the cycle.

19. The non-transitory storage medium of claim 16, comprising further instructions that cause at least one processor to:

obtain a number of individual vehicles in the image data streams.

\*   \*   \*   \*   \*